United States Patent
Travert et al.

(10) Patent No.: US 11,910,054 B2
(45) Date of Patent: Feb. 20, 2024

(54) METHOD AND APPARATUS FOR DECODING A 3D VIDEO

(71) Applicant: InterDigital CE Patent Holdings, Paris (FR)

(72) Inventors: Serge Travert, Dinan (FR); Jean Le Roux, Rennes (FR); Charles Salmon-Legagneur, Rennes (FR); Remi Houdaille, Cesson Sevigne (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 17/780,241

(22) PCT Filed: Nov. 24, 2020

(86) PCT No.: PCT/EP2020/083249
§ 371 (c)(1),
(2) Date: May 26, 2022

(87) PCT Pub. No.: WO2021/105142
PCT Pub. Date: Jun. 3, 2021

(65) Prior Publication Data
US 2023/0007338 A1 Jan. 5, 2023

(30) Foreign Application Priority Data
Nov. 29, 2019 (EP) ..................... 19306539

(51) Int. Cl.
*H04N 21/44* (2011.01)
*H04N 21/81* (2011.01)
*H04N 21/442* (2011.01)

(52) U.S. Cl.
CPC ....... *H04N 21/44* (2013.01); *H04N 21/44209* (2013.01); *H04N 21/816* (2013.01)

(58) Field of Classification Search
None
See application file for complete search history.

(56) References Cited

U.S. PATENT DOCUMENTS 9,573,062 B1 2/2017 Long et al.
2018/0061002 A1* 3/2018 Lee .................... H04N 19/88
(Continued)

FOREIGN PATENT DOCUMENTS

CN 106937128 A 7/2017
EP 3 457 688 A1 3/2019
(Continued)

OTHER PUBLICATIONS

Soonbin Lee et al. "CE3: Viewport-dependent Patch Grouping using HEVC Tiles", International Organization for Standardization, Coding of Moving Pictures and Audio, ISO/IEC JTC1/SC29/WG11, Document: MPEG2019/m50818, Geneva, Switzerland, Oct. 2019, 4 pages.

(Continued)

*Primary Examiner* — Junior O Mendoza
(74) *Attorney, Agent, or Firm* — CONDO ROCCIA KOPTIW LLP

(57) ABSTRACT

A method and an apparatus for decoding a volumetric video are disclosed. Such a method comprises receiving a data stream representative of a file comprising information for selecting, according to a rendering viewpoint, at least one atlas comprising color and depth data patches associated with a viewpoint in said volumetric video, said color and depth data patches being generated with respect to depth and color reference data acquired from a reference viewpoint in said volumetric video.

23 Claims, 6 Drawing Sheets

(56) References Cited

U.S. PATENT DOCUMENTS

2018/0270464 A1* 9/2018 Harviainen .......... H04N 13/344
2018/0364801 A1 12/2018 Kim et al.

FOREIGN PATENT DOCUMENTS

| GB | 2572996 A | 10/2019 | |
|----|-----------|---------|---|
| WO | WO 2018129197 A1 | 7/2018 | |
| WO | WO 2018172614 A1 | 9/2018 | |
| WO | WO 2019079032 A1 | 4/2019 | |
| WO | 2019/191202 A1 | 10/2019 | |
| WO | WO-2019202207 A1 * | 10/2019 | ............. G06T 15/04 |

OTHER PUBLICATIONS

Jeong et al., "Bitrate Efficient 3DoF+ 360 Video View Synthesis for Immersive VR Video Streaming", 2018 International Conference on Information and Communication Technology Convergence (ICTC), Jeju, Korea (South), Oct. 17, 2018, 6 pages.

Salahieh et al., "Test Model for Immersive Video", International Organization for Standardization, ISO/IEC JTC 1/SC 29/WG 11, Coding of Moving Pictures and Audio, Document: N18470, Geneva, Switzerland, Mar. 2019, 27 pages.

English Translation for CN106937128A, entitled: A kind of net cast method, server and system and associated uses, 26 pages.

* cited by examiner

METHOD AND APPARATUS FOR DECODING A 3D VIDEO

CROSS REFERENCE TO RELATED APPLICATIONS

This application is a U.S. National Stage Application under 35 U.S.C. 371 of International Patent Application No. PCT/EP2020/083249, filed Nov. 24, 2020, which is incorporated herein by reference in its entirety.

This application claims the benefit of European Patent Application No. 19306539.8, filed Nov. 29, 2019, which is incorporated herein by reference in its entirety.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Omnidirectional video, also called 360° flat video, allows the user to watch all around himself through rotations of his head around a still point of view. Rotations only allow a 3 Degrees of Freedom (3DoF) experience. Even if 3DoF video is sufficient for an omnidirectional video experience, for example using a Head-Mounted Display device (HMD), 3DoF video may quickly become frustrating for the viewer who would expect more freedom, for example by experiencing parallax, i.e. 3D rendering. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. A content may be created by means of dedicated sensors allowing simultaneous recording of color and depth of a scene of interest. The use of a rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

Viewing experience to users is often offered to users through streaming session. Encoded volumetric videos may be sent from a streaming server to a user's terminal through wired or wireless network connections. However, network connection shall accommodate to these new video formats, and more particularly in terms of bandwidths. There are still some limitations of the networks which put constraints on the video contents and formats to be delivered to end devices.

It should be noted that such volumetric videos need a large volume of data to be transmitted to an end device in order to offer a realistic perception of 3D space in the scene displayed and to offer the possibility for the user to "move in the scene", i.e. change the viewpoint like when moving in the real world, while avoiding visual artifacts.

Therefore, there is a need for improving the state of the art.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

According to an aspect of the present disclosure, a method for decoding a volumetric video is presented. Such a method comprises receiving a data stream representative of a file comprising information for selecting, according to a rendering viewpoint, at least one atlas comprising color and depth data patches associated with a viewpoint in the volumetric video, the color and depth data patches being generated with respect to depth and color reference data acquired from a reference viewpoint in the volumetric video.

In an embodiment, the method comprises requesting to a server, using information comprised in the file:

at least one data stream representative of a reference view comprising the color and depth reference data and, at least one data stream representative of at least one selected atlas, and decoding the at least one data stream representative of the reference view and the at least one data stream representative of the at least one selected atlas.

According to another aspect of the present disclosure, a method for encoding a volumetric video is presented which comprises:

encoding at least one data stream representative of at least one reference view comprising color and depth reference data associated with (e.g. acquired from) a reference viewpoint in the volumetric video, encoding at least one data stream representative of at least one atlas comprising color and depth data patches associated with (e.g. acquired from) a viewpoint in the volumetric video, the color and depth data patches being generated with respect to depth and color reference data, encoding a data stream representative of a file comprising information for selecting at least one atlas, according to a rendering viewpoint in the volumetric video.

According to another aspect of the present disclosure, a data stream is presented, which is representative of a file comprising information for selecting, according to the rendering viewpoint of a volumetric video, at least one atlas comprising color and depth data patches associated with at least one virtual camera corresponding to a viewpoint in the volumetric video, the color and depth data patches being generated with respect to depth and color reference data associated with the reference viewpoint in the volumetric video.

According to another aspect of the present disclosure, an apparatus for decoding a volumetric video is presented which comprises means for receiving a data stream representative of a file comprising information for selecting, according to a rendering viewpoint, at least one atlas comprising color and depth data patches associated with a viewpoint in the volumetric video, the color and depth data patches being generated with respect to depth and color reference data acquired from a reference viewpoint in the volumetric video.

According to another aspect of the present disclosure, an apparatus for encoding a volumetric video is presented, which comprises:

means for encoding at least one data stream representative of at least one reference view comprising color and depth reference data associated with a reference viewpoint in the volumetric video, means for encoding at least one data stream representative of at least one atlas comprising color and depth data patches associated with at least one virtual camera corresponding to a viewpoint in said volumetric video, the color and depth data patches being generated with respect to depth and color reference data associated with the reference viewpoint in the volumetric video, means for encoding a data stream representative of a file comprising information for selecting at least one atlas, according to a rendering viewpoint of the volumetric video.

According to a further aspect of the present disclosure, a computer program is presented which comprises instructions to command the execution of the method steps according to any one of embodiments presented herein, when the instructions are processed by a processor.

4. BRIEF DESCRIPTION OF DRAWINGS

The present disclosure will be better understood, and other specific features and advantages will emerge upon reading the following description, the description making reference to the annexed drawings wherein.

Figure 9:
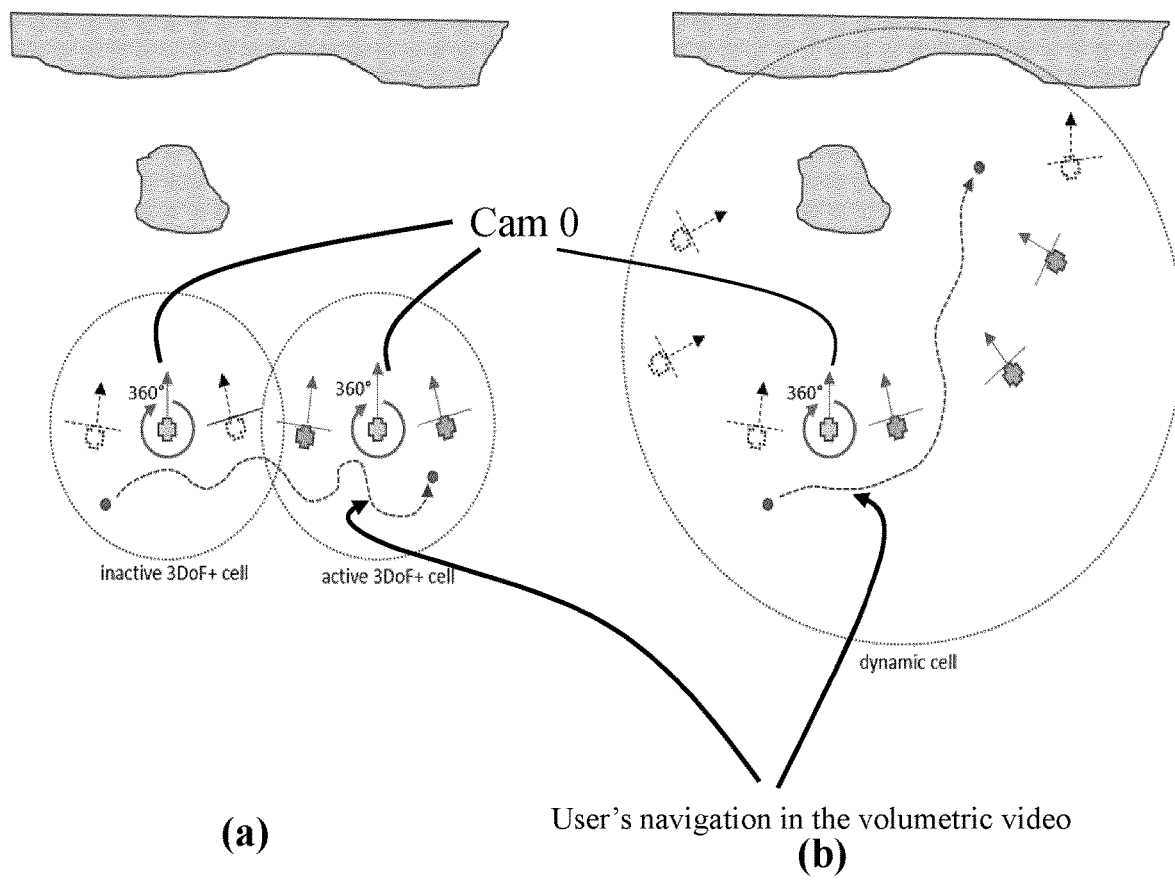
Figure 10:
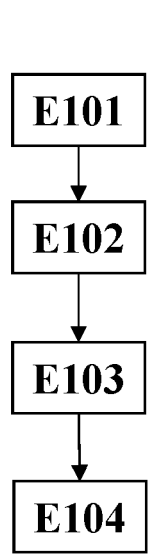
Figure 11:
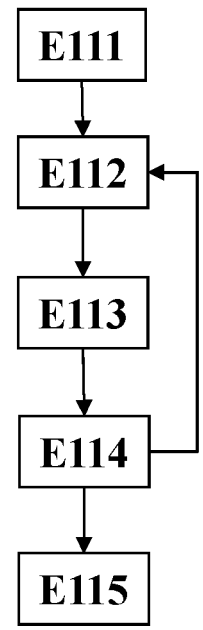
Figure 12:
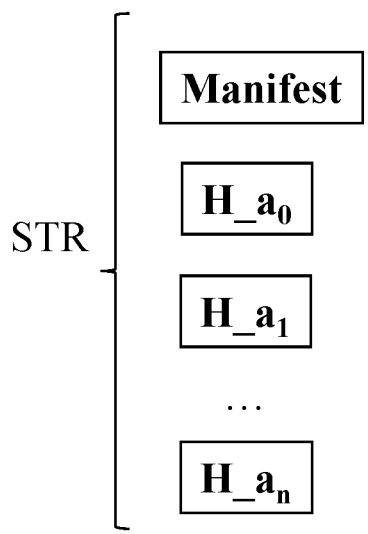
Figure 13:
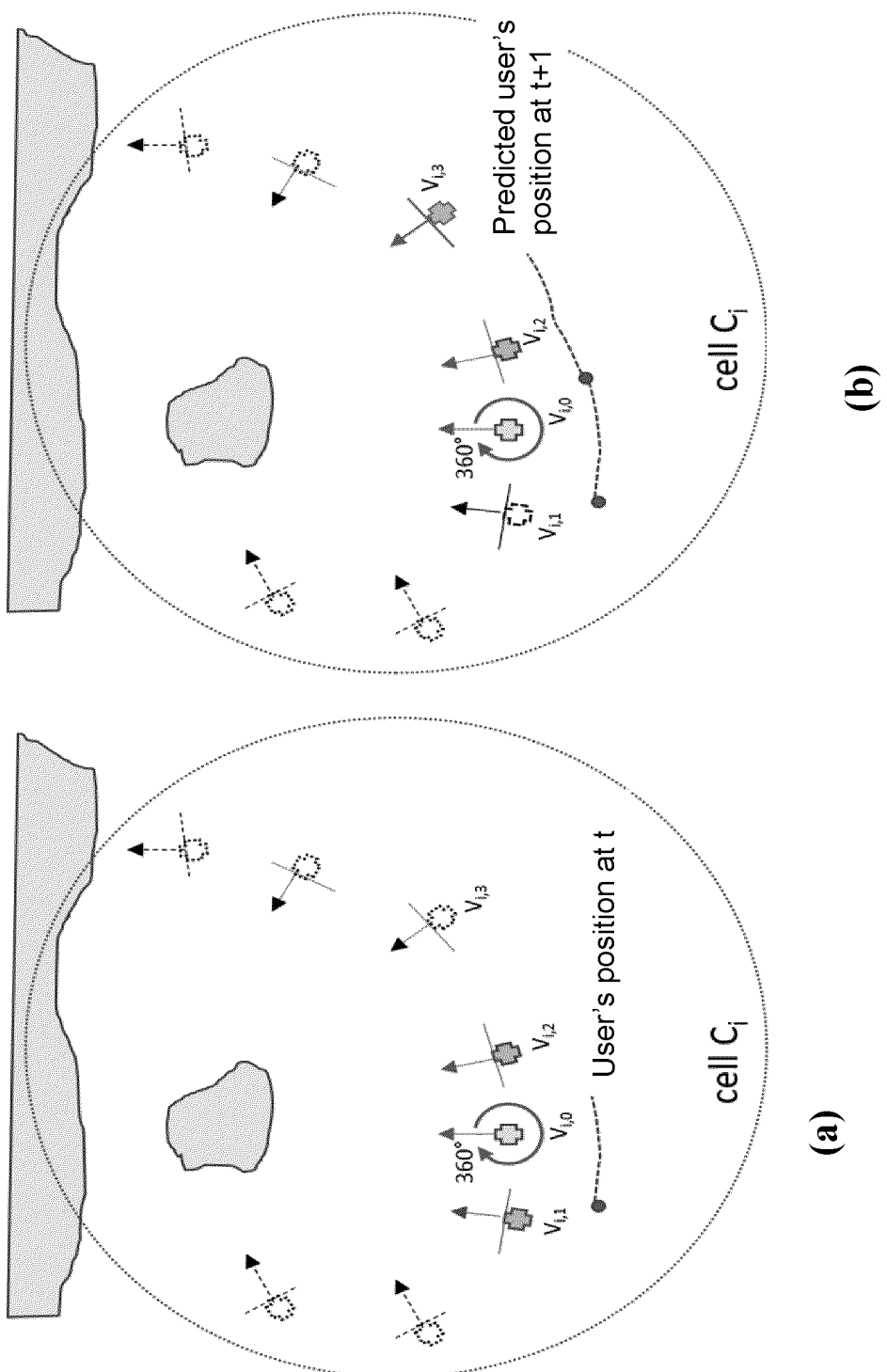

FIG. 9 illustrates a multi 3DOF+ cells approach and a dynamic cell using additional cameras according to an embodiment of the present disclosure, FIG. 10 illustrates an exemplary method for encoding a volumetric video according to an embodiment of the present disclosure, FIG. 11 illustrates an exemplary method for decoding a volumetric video according to an embodiment of the present disclosure, FIG. 12 illustrates an exemplary data stream representative of a volumetric video according to an embodiment of the present disclosure, FIG. 13 illustrates an example of adaptive selection of virtual cameras within a 3DOF+ cell by a terminal.

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

To improve the immersivity in 360° video contents rendered, a so-called 3DOF+ approach may be used. According to this 3DOF+ approach data information is added to the video data for allowing to generate parallax effects when rendering video on an end terminal. According to this approach, the volumetric input is processed to generate a combination of color and depth patches stored in color and depth atlases. Planar representations of the volumetric content are obtained such that they can then be processed by legacy video codecs. The patches are obtained from a peeling of the 3D scene, each individual patch resulting from a mapping (typically projections such as ERP—EquiRectangular Projection, cubemap projection, . . . ) of a subpart of the scene on a given virtual camera. Such a decomposition peels and factorizes the scene as:

i) a central patch containing the part of the scene visible from a main central viewpoint and ii) peripheral patches embedding the complementary information non-visible from this central viewpoint.

Such contents may come from real captures or can be generated from existing Computer Graphics (CG) contents.

Figure 8:
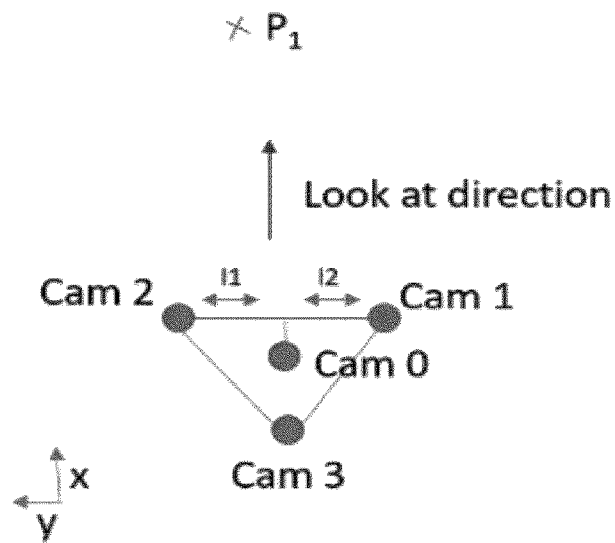
FIG. 8 illustrates an exemplary positioning of 4 virtual cameras for a 3DOF+ cell according to the SoA approach.

An exemplary implementation of the 3DOF+ approach is illustrated by FIG. 8. A central patch and the additional information are defined thanks to the introduction of 4 virtual cameras (Cam0-3), placed at the center (Cam0) and at each vertex of a tetrahedron (Cam1-3), as illustrated on FIG. 8. The central viewpoint corresponds to the view from camera Cam0. Additional information is recovered thanks to the 3 additional virtual cameras Cam1, Cam2 and Cam3. The central and lateral viewpoints corresponding to the 4 virtual cameras, and their associated color and depth patches, characterize a 3DoF+ cell.

In an embodiment, all volumetric data seen by the camera Cam0 are sent as it is for instance through 360° ERP color and depth streams if ERP mapping is used. However, other kinds of mapping could also be used. All other points seen by cameras Cam1 to Cam3 are transmitted via additional patches if they are not seen by camera Cam0. So, the greater the distance between camera i (i in [1;3]) and camera Cam0, the more additional points will be visible, i.e. the more the parallax information and so the patches number will be important.

According to the current 3DOF+ approach, for a 3DOF+ cell, all the color and depth patches from the central and lateral viewpoints corresponding to the virtual cameras are sent to the end device.

Consequently, this approach limits the capability of the end device to optimize parallax rendering and immersion effect as a function of the evolving network throughput. It also limits the capability of the end device to optimize parallax rendering and immersion effect as a function of the video content, and of other factors related to the behavior of the user of the end device.

Finally, because existing approaches require to systematically send to end devices at the same time all parallax information which has been generated for a given viewpoint, this prevents from adding further parallax information which may enhance content immersion and/or extend the size of the cell, due to the constraint of keeping as low as possible the network bandwidth required to transmit the content data.

Thus, according to the present disclosure, the end device player is provided with the possibility to select in a flexible way a number and location of the so-called "side" virtual cameras, associated to color and depth atlases transmitted to allow parallax rendering.

According to a principle of the present disclosure, a terminal or end device is given the following new adaptative abilities:

When navigating into 3DOF+ contents, the terminal can select which color and depth patches, i.e. which virtual cameras, the terminal will request, for the 3DoF+ cell corresponding to the viewpoint it will render on the display. To perform this selection, it may implement "intelligent" strategies based on various decision criteria which may be related to the network throughput currently available, the characteristics of the terminal, observations on the current behavior of the end user, strategies for rendering of 3DOF+ contents based on usage data collected by the terminal, . . . .

To allow the terminal to deploy such intelligent strategies for parallax rendering, the number and locations in space of the virtual cameras, associated to the color and depth atlases where color and depth patches are stored, can vary throughout the duration of the video content; the atlases associated to the virtual cameras are all streamable individually and independently from each other, contrarily to the existing approaches.

The terminal receives specific signaling information describing the various parameters involved with these new capabilities. This signaling information can be updated at a frequency of the parameter changes (for instance at every group of pictures (GoP)). Such a signaling can include:
- a number of virtual cameras used to provide the color and depth patches to be used to generate parallax,
- a location of these virtual cameras,
- a quantitative information on the size (in terms of volume of data to transmit) of the color and depth patches associated to each virtual camera,
- information of various kinds on the characteristics and usability of the color and depth patches associated to each virtual camera, which can be useful for the terminal player to select for which virtual camera it will request color and depth patches from a server.

Thanks to the possibility to offer atlases of color and depth patches, associated to a number of virtual cameras, with signaling allowing the terminal to select and request from the server any subset/combination of these atlases/virtual cameras, the terminal player can adapt its capability of processing and rendering parallax to the evolving available network throughput.

Figure 1:
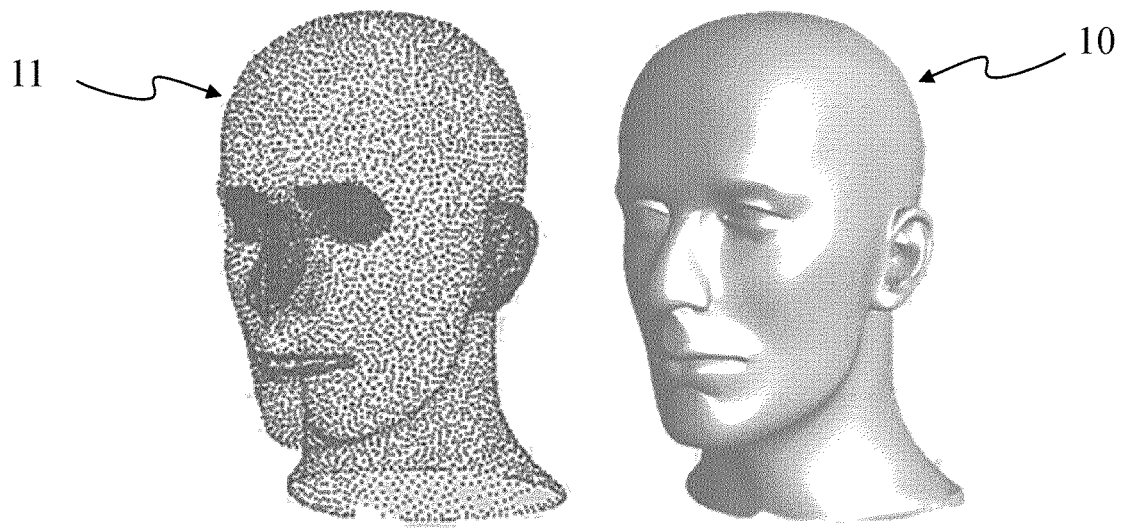
FIG. 1 shows a three-dimension (3D) model of an object and points of a point cloud corresponding to the 3D model, according to a non-limiting embodiment of the present principles.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luminance component and UV two chrominance components). The point cloud is a representation of a 3D scene. The 3D scene may be a real scene captured by a video camera. The 3D scene may be seen from a given viewpoint or a range of viewpoints. The point cloud may be obtained by many ways, e.g.:
- from a capture of a real scene shot by a rig of cameras, optionally complemented by depth active sensing device;
- from a capture of a virtual/synthetic scene shot by a rig of virtual cameras in a modelling tool;
- from a mix of both real and virtual scenes.

Some benefits of the principle disclosed herein are illustrated hereafter. This is a non-exhaustive list of all potential benefits that can be derived from the present principle.

Improved Capacity of the Terminal to Optimize the Parallax Effect, and Thus the Volumetric Immersion, as a Function of an Available Network Throughput Let us consider that the video content available in the server at a given time for a given viewpoint is a combination of a color and depth atlas $a_0$ corresponding to a reference (central) virtual camera, and of n additional color and depth atlases $a_i$ (i=1,n) corresponding to n additional side virtual cameras, which can be selected individually.

The network throughput required to transmit simultaneously all atlases ($a_0$ and $a_1$ to $a_n$) will be rather high (for an UHD video quality, $a_0$ may typically require 20 Mbps and each $a_i$ typically a few Mbps). In many situations the network throughput available for the end terminal may not be sufficient to transmit all atlases, but may allow to transmit the atlas $a_0$ and some of the atlases $a_i$ (i=1,n).

According to the principle disclosed herein, the terminal may request the transmission of the atlas $a_0$ and some of the atlases $a_i$, and so to be able to stream the immersive 3DOF+ content, whereas access to the immersive 3DOF+ content would be impossible with existing solutions which can only deliver the full set of all atlases.

If the network throughput available for the terminal decreases, the terminal may, for instance, stop requesting a subset of additional atlases $a_i$ corresponding to the level of throughput decrease, minimizing the loss of parallax information that it induces.

Similarly, if the network throughput available for the terminal increases, the terminal may request a subset of additional atlases $a_i$ corresponding to the level of throughput increase, maximizing the additional benefit it can derive of extra parallax information.

Furthermore, the terminal may assess, from the network throughput currently available, and using the signaling information (metadata) transmitted to characterize each atlas $a_i$, which number/combination of additional atlases $a_i$ it can afford additionally to the atlas $a_0$, and it can select a combination that optimizes the parallax and immersive effect as a function of criteria dealing with the video content and/or an end user position and navigation behavior. Examples of that are further described later.

If the video content is stored in a server and proposed to the terminal in various quality levels associated with various bit rates—i.e. both $a_0$ and $a_i$ (i=1,n) atlases are proposed with various quality and bit rate levels -, as it is often the case for video contents to be accessed via adaptive streaming, the terminal can arbitrate image quality versus immersion quality in a way which is optimized for its characteristics. For instance a smartphone with a small screen may favor a compromise where it requests from the server all $a_0$ and $a_i$ (i=1,n) atlases with a lower image definition, whereas a TV set with a large screen may favor a compromise where it requests from the server $a_0$ and a few $a_i$ (i=1,n) atlases with a better image definition.

Thanks to the possibility to offer atlases of color and depth patches, associated to a number of virtual cameras, with signaling allowing a terminal to select and request from the server any subset/combination of these atlases/virtual cameras, the terminal player can adapt its capability of processing and rendering parallax to the evolving available network throughput:

- If network throughput allows it, it can request the totality of the atlases corresponding to all virtual cameras, and hence is able to generate and render the maximum parallax effect that the source content can offer;
- When network throughput is not sufficient to allow the delivery of all atlases, the terminal player can request a subset of atlases that allows it to get the most data for parallax effect that the network bandwidth can afford;
- When available network bandwidth increases, the terminal player can request additional atlases, and thus improve the parallax and immersion effect;
- When bandwidth available decreases, the terminal player can still select the maximum number of atlases that is compatible with the available bandwidth, and thus preserve as much as possible parallax and immersion effect.

The above section emphasized the improvements brought by the principle of the present disclosure, in terms of maximizing the parallax and immersion effect as a function of the network bandwidth available (insufficient bandwidth to transmit all atlases available, variations in time of the network bandwidth available). The next two sections emphasize what benefits can be obtained, in terms of improvement in parallax and immersion effect, by adding virtual cameras which can be selected by the terminal as a function of a scene content and/or a user navigation behavior.

Improved Parallax and Immersion Effect by Adding Virtual Cameras, with Associated Color and Depth Patches, During the Video Content Duration, Based on the Video Content The principle disclosed herein allows to add extra virtual cameras, to enrich the parallax information made available, for periods of the video content where the ability to generate an improved parallax effect is particularly relevant. For instance, when the scene captured from a current reference viewpoint includes several regions of interests (characters, animals, objects, . . . ) of complex shapes located at various depths, with partial mutual occlusions, adding virtual cameras can avoid generating artifacts while keeping a same amplitude of movements of the user around the reference viewpoint in the 3DOF+ cell.

According to the present principle, the terminal is allowed to select a number of additional atlases according to the available network bandwidth, the number of additional virtual cameras can be increased during such critical content periods as much as it is useful, without increasing up to a prohibitive level the network bandwidth required to deliver the content, so without generating potential side issues for content delivery.

Improved Parallax and Immersion Effect by Adding Virtual Cameras, with Associated Color and Depth Patches, to Accommodate Variable User Behaviors With state of the art (SoA) approaches that do not give the possibility to select a subset of the additional atlases associated to side virtual cameras, a compromise has to be found between keeping as low as possible the additional network bandwidth required to transmit the additional atlases for parallax, and sending as much additional atlases as possible to increase the parallax and immersion effects. According to the present principle, it is possible to add any further atlases that can improve the user experience for some particular navigation behaviors, which can be selected by a terminal only when the available network bandwidth allows it, or when it is more relevant due to a current user behavior. For instance, additional virtual cameras can be added to enlarge the potential range of movements around a reference central viewpoint. This can allow:

- To increase the amplitude of user movements around the reference central viewpoint when the network bandwidth allows to transmit all atlases,
- Or to select atlases best fitting to the position/movements of the end user versus the reference central viewpoint, when all atlases cannot be transmitted,
- And to increase the speed of displacement that can be accommodated without artefacts.

Enlarging Significantly the Size of a Cell by Adding a High Number of Virtual Cameras, to Allow Parallax Rendering in a Large Area Around a Viewpoint By further increasing the number of side virtual cameras with associated color and depth atlases, we can significantly enlarge the area around a reference viewpoint where the end user will be able to move, while keeping a full parallax rendering. There is no strong limitation, in terms of network bandwidth required, to the number of such side virtual cameras that can be added, as all extra atlases are not systematically transmitted to the end device. Indeed, they are individually delivered only when the end device requests them, when they are relevant for the current navigation behavior of the end user and when the available network bandwidth can afford it.

It provides a solution for keeping good parallax rendering even when the end user moves rapidly when navigating in the rendered scene. In the SoA 3DoF+ approach, enlarging the area where parallax is rendered is provided through multi 3DoF+ cells. Keeping a good parallax rendering when the user moves away from the reference central viewpoint requires to switch to a neighbor cell. The maximum speed of movements that are possible with a good parallax rendering is consequently much lower, compared to the principle disclosed herein.

FIG. 9 illustrates on the left-hand side (a) a multi-cells SoA 3DoF+ approach and on the right hand side (b) an exemplary dynamic use of additional cameras according to an embodiment of the present disclosure. In each one of these illustrated approaches, "Cam 0" represents viewpoints of a central camera 360°, these central cameras are illustrated with circled grey crosses. It can be seen that according to the 3DoF+ cells approach (FIG. 9(a)), two cells are represented, each one with a central camera. While, in the dynamic cell approach, (FIG. 9(b)), one central camera is used.

Other grey crosses represent the viewpoints with active additional camera (which provides parallax patches). By active additional camera, it should be understood here, the additional camera available to the rendering device. In the case of the 3DoF+ cells approach, all the peripheral cameras of the second 3DoF+ cell are available. It corresponds to the peripheral cameras of the active cell, the active cell being the 3DoF+ cell in which the user is positioned for rendering (illustrated in FIG. 9 by a grey point). White crosses represent the viewpoints with inactive additional camera. By inactive additional camera, it should be understood here, an additional camera that is not available to the rendering device.

In the case of the dynamic cell, it can be seen that according to the principle disclosed herein, the cell comprises active and inactive additional cameras. On FIG. 9 (b), according to an embodiment of the present principle, the main camera corresponds to the reference view that is sent to the terminal, the active additional cameras corresponds to the selected atlases that are selected by the terminal for improving the parallax of the rendering. The inactive additional cameras are the virtual cameras that are not selected by the terminal, and thus not requested to the server.

In the remaining of the document, for ease of understanding, we will use the following terms and definitions:

$C_i$ will denote a 3 DoF+ cell, which involves the following elements and parameters:

A reference central virtual camera, corresponding to a central reference viewpoint denoted $V_{i,0}$, with coordinates $(x_{i,0}, y_{i,0}, z_{i,0})$ in a global 3D cartesian coordinates system; the central atlas generated in the cell $C_i$ contains the part of the scene visible from this central reference viewpoint $V_{i,0}$.

n side virtual cameras, corresponding to peripheral viewpoints denoted $V_{i,j}$ (j=1,n), with coordinates $(x_{i,j}, y_{i,j}, z_{i,j})$ which can be either its coordinates in a global 3D cartesian coordinates system or its relative coordinates in the local 3D cartesian coordinates system centered on the central viewpoint $V_{i,0}$ of the cell; to each side virtual camera is associated a peripheral atlas embedding the complementary information visible from the viewpoint Vi which is not visible from the central viewpoint $V_{i,0}$.

We call atlas a whole color+depth data associated with a virtual camera corresponding to a particular viewpoint. A central atlas $A_{i,0}$ contains the information relative to the central reference viewpoint $V_{i,0}$ of the cell $C_i$, i.e. the color and depth reference data associated with the reference view. A peripheral atlas $A_{i,j}$ contains the information relative to a peripheral viewpoint $V_{i,j}$ of the cell $C_i$, i.e. the color and depth data associated with the peripheral viewpoint and where points already visible from $V_{i,0}$ have been removed. According to the principle disclosed herein, atlases are streamable individually and independently from each other, and can be requested on demand by the terminal.

Figure 5:
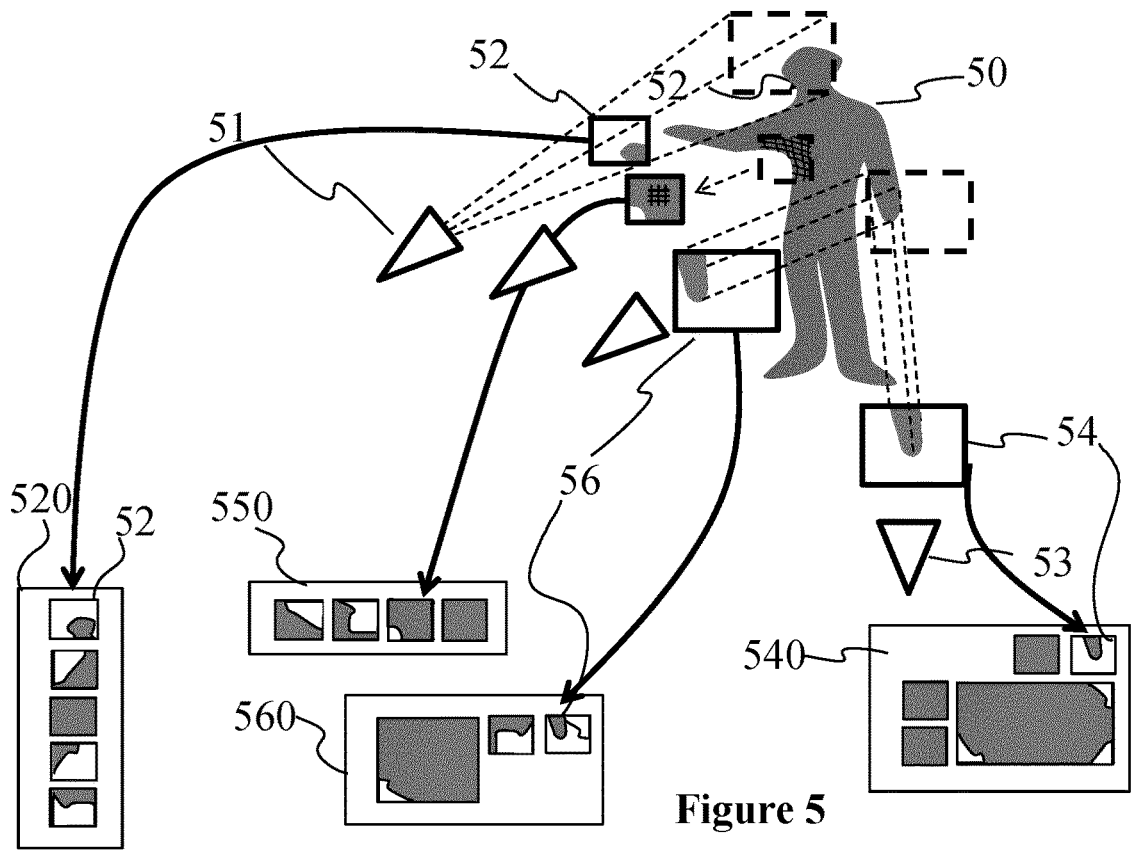
FIG. 5 illustrates a spherical projection into patches for multiple points of view, according to a non-limiting embodiment of the present principles.

FIG. 5 illustrates the patches atlas approach with an example of 4 projection centers, i.e. 4 virtual cameras. The patches atlas approach is not limited to this number of virtual cameras.

3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection information of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches which are packed in rectangular atlases 520, 540, 550 and 560. The organization of patches within each of the atlas defines the atlas layout. In an embodiment, two atlases with identical layout: one for texture (i.e. color) information and one for depth information are used.

It can be seen that according to the principle disclosed herein, the 2D patches obtained from each one of the virtual cameras are packed in separate atlases. In other words, for each virtual camera, one atlas of color and depth information comprises all the patches obtained for this camera, or two atlases in case color and depth information are packed in separate atlases.

Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in a data stream in association with the compressed data of the atlases.

Figure 2:
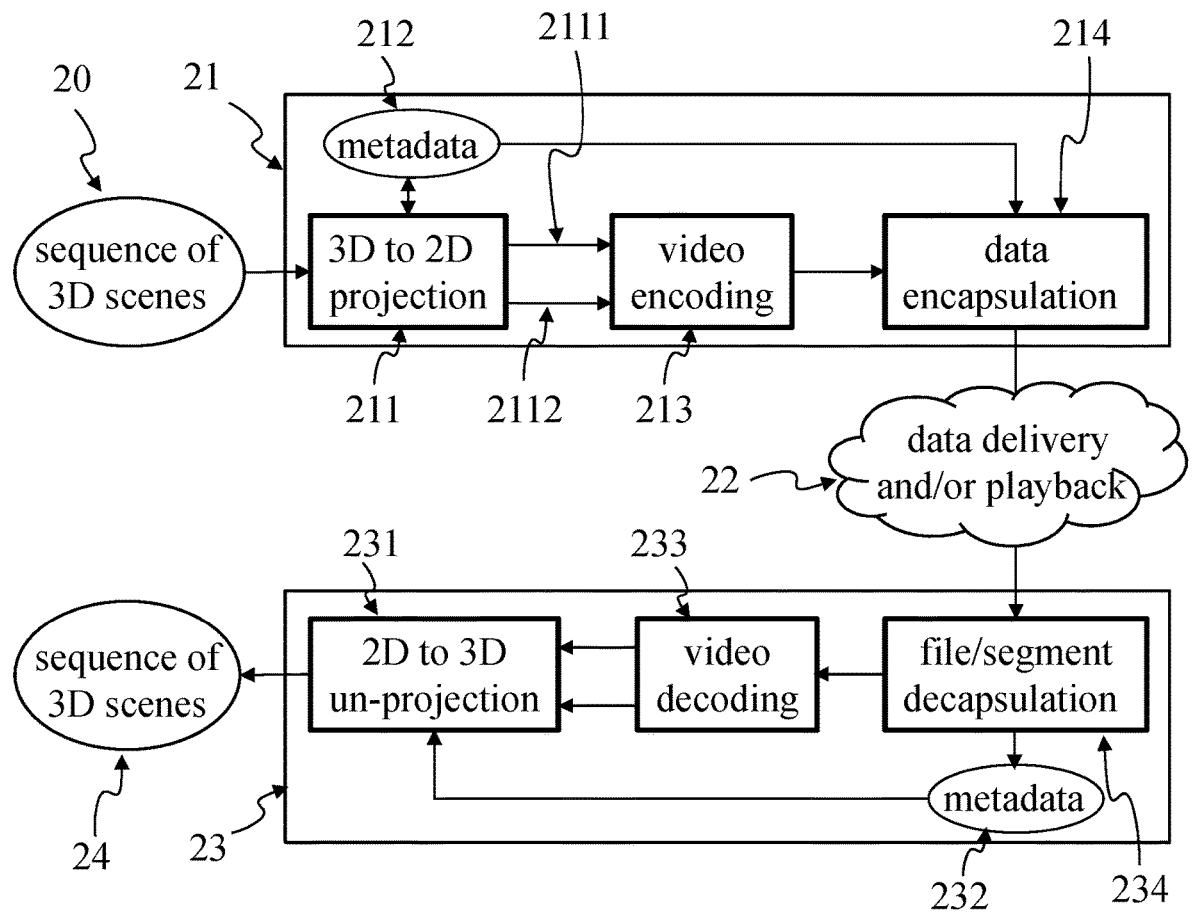
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3DoF+ or 6DoF rendering and displaying.

Sequence of 3D scenes 20 is provided to an encoder 21. The encoder 21 takes one 3D scene or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

According to an embodiment of the present disclosure, all color and depth patches associated to a given virtual camera are encapsulated in an atlas encoded as a separate data stream. For instance, a data stream representative of the one reference view comprising color and depth reference data associated with the reference viewpoint is encoded, and a plurality of data streams respectively representative of atlases comprising color and depth data patches associated with peripheral virtual cameras. The color and depth data patches are generated with respect to depth and color reference data associated with the reference viewpoint.

Encoder 213 is for example compliant with an encoder such as:
- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-Fen);
- 3D-HEVC (an extension of HEVC whose specification is found at the ITU website, T recommendation, H series, h265, http://www.itu.int/rec/T-REC-H.265-201612-I/en annex G and I);
- VP9 developed by Google; or
- AV1 (AOMedia Video 1) developed by Alliance for Open Media.

The data streams are stored in a memory that is accessible, for example through a network 22, by a decoder 23. Also, a data stream representative of a file comprising information for selecting one or more atlases from the plurality of atlases, according to a rendering viewpoint is encoded.

On FIG. 2, decoder 23 comprises different circuits implementing different steps of the decoding. Decoder 23 takes at least one data stream generated by an encoder 21 as an input and provides a sequence of 3D scenes 24 to be rendered and displayed by a volumetric video display device, like a Head-Mounted Device (HMD). According to a variant, the decoder 23 may also provided the images to be rendered to the volumetric video display device which displays the images. Decoder 23 obtains the stream from a source 22. For example, source 22 belongs to a set comprising:
- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface or a 4G/5G interface); and
- a user interface such as a Graphical User Interface enabling a user to input data.

Decoder 23 comprises a circuit 234 to extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
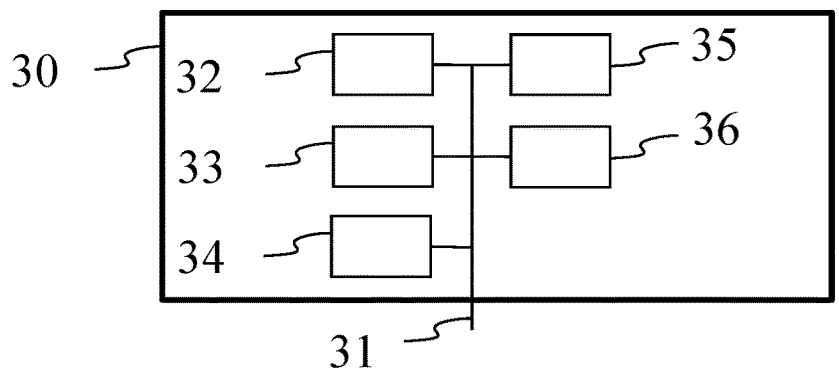
FIG. 3 shows an example architecture of a device which may be configured to implement a method described in relation with FIGS. 10 and 11, according to a non-limiting embodiment of the present principles.

FIG. 3 shows an example architecture of a device 30 which may be configured to implement a method described in relation with FIGS. 10 and 11. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU, and/or GPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 10 and 11, and belongs to a set comprising:
- a mobile device;
- a communication device;
- a game device;
- a tablet (or tablet computer);
- a laptop;

a television;
a still picture camera;
a video camera;
an encoding chip;
a server (e.g. a broadcast server, a video-on-demand server or a web server).

Figure 4:
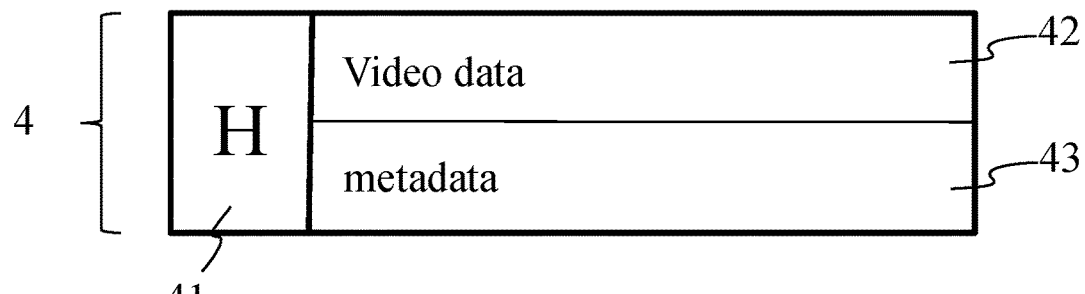
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a data stream encoded for instance by the encoder discussed in relation with FIG. 2. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards). According to the embodiment disclosed herein, the data stream representative of the reference view and the data streams representative of the atlases associated with the peripheral virtual cameras can be encoded according to the syntax structure illustrated on FIG. 4.

Figure 6A:
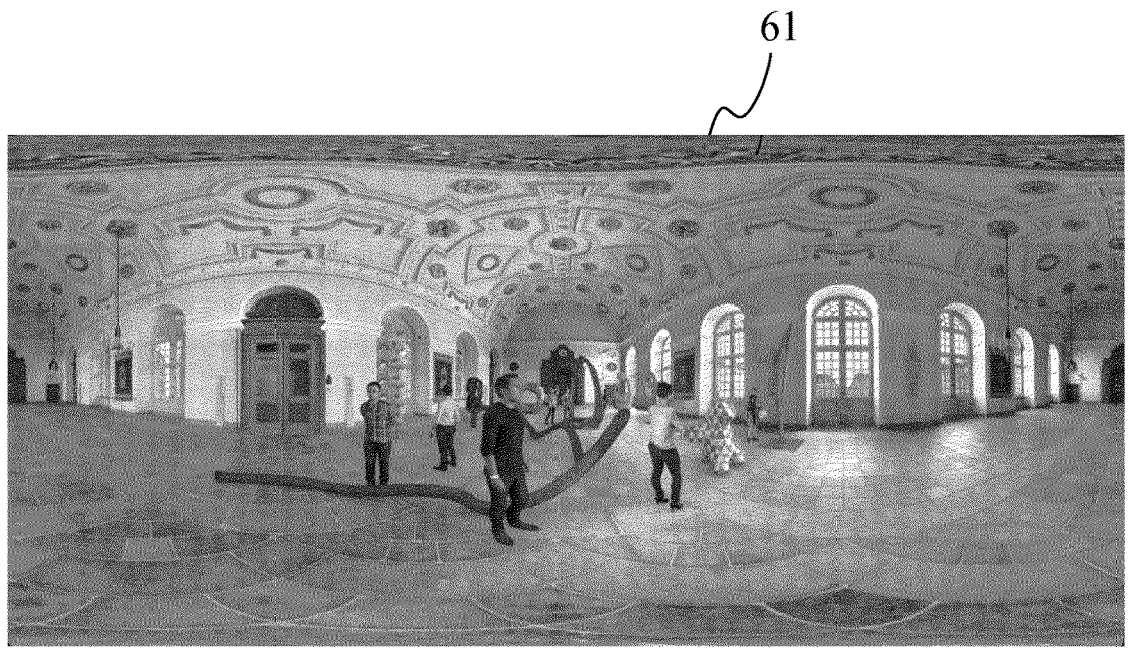
FIGS. 6a and 6b show an example of texture information of the points of a 3D scene for atlases defined for a main point of view (FIG. 6a) and a virtual cameras (FIG. 6b), according to a non-limiting embodiment of the present principles.
Figure 6B:
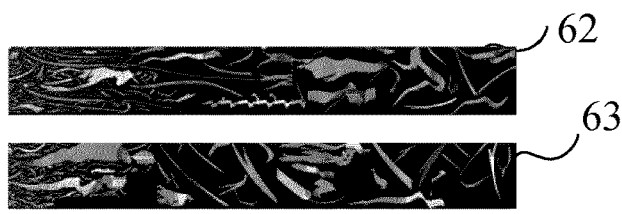

FIGS. 6a and 6b show an illustrative example of a reference atlas 61 and peripheral atlases 62 and 63 comprising the texture information (e.g. RGB data or YUV data) of the points of a 3D scene, according to a non-limiting embodiment of the present principles. As explained in relation to FIG. 5, an atlas is an image packing together patches, a patch being a picture obtained by projecting a part of the points of the 3D scene.

In the example of FIG. 6a, atlas 61 comprises the texture information of the points of the 3D scene that are visible from the reference point of view. This texture information may for example be obtained according to an equirectangular projection mapping, an equirectangular projection mapping being an example of spherical projection mapping.

In the example of FIG. 6b, atlases 62 and 63 comprises texture information of parts of the 3D scene that are complementary to the part visible from the reference point of view. This texture information may be obtained by removing from the 3D scene the points that are visible from the main viewpoint (the texture of which being stored in atlas 61) and by projecting the remaining points according to the same point of view. Atlases 62 and 63 thus correspond to the color data of respectively peripheral virtual cameras in the video. According to the principle disclosed herein, the color and depth data of the peripheral virtual cameras in the video are encoded in separate bitstreams.

The projection process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

Figure 7A:
FIGS. 7a and 7b show an example of depth information of the points of the 3D scene for atlases defined for a main point of view (FIG. 7a) and virtual cameras (FIG. 7b) of FIGS. 6a and 6b, according to a non-limiting embodiment of the present principles.
Figure 7B:
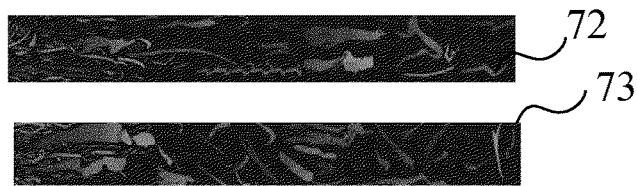

FIGS. 7a and 7b shows an illustrative example of a reference atlas 71 and peripheral atlases 72 and 73 comprising the depth information of the 3D scene of FIGS. 6a and 6b, according to a non-limiting embodiment of the present principles. Atlas 71 may be seen as the depth image corresponding to texture image 61 of FIG. 6a, and atlases 72 and 73 may be seen as the depth image corresponding to texture image 62 and 63 respectively of FIG. 6b.

Atlas 71 comprises the depth information of the points of the 3D scene that are visible from the central point of view. Atlas 71 may be obtained in a same way as atlas 61 but contains the depth information associated with the points of the 3D scene instead of the texture information.

In the example of FIG. 7b, atlases 72 and 73 comprise depth information of parts of the 3D scene that are complementary to the part visible from the reference point of view, and may be obtained in a same way as for the texture information.

With regard to 6DoF rendering, the user may move the viewpoint everywhere in the scene. In this case, it is required to encode every point (depth and texture) of the scene as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

FIG. 10 illustrates an exemplary method for encoding a volumetric video according to an embodiment of the present disclosure. For instance, the encoding method is performed by the encoder disclosed in relation with FIG. 2.

In a step E101, at least one data stream representative of a reference view comprising color and depth reference data associated with a reference viewpoint in the volumetric video is encoded.

In a step E102, at least one data stream representative of at least one atlas comprising color and depth data patches associated with at least one virtual camera corresponding to a viewpoint in the volumetric video is encoded. As discussed above, the color and depth data patches are generated with respect to depth and color reference data associated with the reference viewpoint in the volumetric video.

In a step E103, a data stream representative of a file comprising information for selecting at least one atlas, according to a rendering viewpoint of the volumetric video is encoded.

An exemplary structure STR of the encoded data streams is illustrated on FIG. 12. The structure of FIG. 12 comprises the data stream representative of the file (Manifest) and a set of video data streams: $H\_a_i$, i=0,n. The data stream $H\_a_0$ corresponds to the data stream representative of the reference view, the data streams $H\_a_1, \ldots, H\_a_n$ correspond respectively to the data streams representative of the atlases, n being a number of peripheral virtual cameras in the volumetric video. It should be noted that according to an embodiment of the present disclosure, n can vary through the duration of the video.

According to the present disclosure, for rendering a viewpoint of the volumetric video, a terminal will select the data streams among the plurality of data streams depending on its capacities, on the transmission bandwidth, etc. . . . using the information embedded in the Manifest.

Such a manifest describes the parameters required to manage the steps of the video transfer to the terminal. It includes in particular, among other information which are not described here as they are not specific to the implementation of the present principle:

The list of reference viewpoints $V_{i,0}$ and their coordinates $(x_i, y_i, z_i)$ in a global 3D cartesian coordinates system, each reference viewpoint $V_{i,0}$ being associated to a so-called 3DoF+ cell $C_i$;

The information to manage properly, during the video content duration, all parameters that are related to the adaptive load of the parallax which is an object of the principle presented herein. These parameters are called in the following "adaptive parallax parameters".

These adaptive parallax parameters can be:

The number of side virtual cameras in a cell, associated to color+depth atlases generated in reference to the reference viewpoint $V_{i,0}$ of the cell, which can be requested independently from each other by the terminal;

For each such side virtual camera:
  the coordinates of the corresponding viewpoint $V_{i,j}$;
  the parameters that characterize the projection operated for this peripheral viewpoint $V_{i,j}$: orientation, field of view (FoV/theta, phi), projection method applied to project on 2D textures (ERP, EDP, orthogonal, pinhole, . . . );
  a parameter quantifying the size (in bytes) or the requested bit rate (in bps) for transmission of the color+depth atlas $A_{i,j}$ associated to this virtual camera;
  possibly a list of one or several zones of main interest for which parallax is best improved with the transmission of the corresponding atlas $A_{i,j}$; each zone of interest can be characterized by a (several) parameter (s) describing its location in the global 3D space, such as its mean depth, its depth range, its vertical and/or horizontal angular sector, . . .
. . .

Also, for allowing the downloading of encoded data streams representative of an atlas associated with a reference viewpoint or a virtual camera, the adaptive parallax parameters comprise a uniform resource identifier for each one of the available data stream.

According to an embodiment of the present disclosure, information for managing the "adaptive parallax parameters" can be included in the manifest. Such information could include:

The list and values of parameters that remain unchanged for the full duration of the video content;

For the parameters that may change in the course of the video content: a description of the time when each such parameter can change, in a format which makes reference to the temporal organization of the video content itself; for instance, the number and/or the location of the so-called side virtual cameras may change at every GoP or at every intra-period of a GoP (half GoP, third of a GoP, . . . ).

The adaptive parallax parameters can be changed in the course of the video content.

Therefore, according to an embodiment of the present disclosure, in a step E104 of the encoding method, the file "Manifest" is updated and sent to the terminal. The file is updated with data that comprises at least one value for updating at least one of the adaptative parallax parameters that have changed in the course of the video content.

According to an embodiment of the present disclosure, the manifest file is stored on a video content transfer server, optionally with the video data streams.

FIG. 11 illustrates an exemplary method for decoding a volumetric video according to an embodiment of the present disclosure. For instance, the decoding method is performed by the decoder discussed in relation with FIG. 2 or more generally by the player of a terminal.

In adaptive streaming systems, the terminal must regularly request from the server the next files transporting the data it needs to render and play a new temporal segment of the content.

In a step E111, the terminal receives a data stream representative of a manifest file as discussed above. Such a file comprises information for selecting, according to a rendering viewpoint, at least one atlas comprising color and depth data patches associated with a viewpoint in the volumetric video, said color and depth data patches being generated with respect to depth and color reference data acquired from a reference viewpoint in the volumetric video.

According to an embodiment of the present disclosure, the received signaling information comprises a list of all alternative versions of the video representations for a given temporal segment, and the uniform resource identifiers (URIs) of the corresponding data streams.

According to the present disclosure, there will be different data streams, for each 3DoF+ cell $C_i$, allowing to select different color+depth atlases $A_{i,j}$ to be requested in addition to the atlas $A_{i,0}$ associated to the central reference viewpoint Vo.

Additionally, according to an embodiment of the present disclosure, there may be also a plurality of quality levels for all atlases, corresponding to a plurality of bit rates, to offer more flexibility in adapting both the image quality level and the immersion (parallax) quality level to the network bandwidth available. According to this embodiment, the adaptative parallax parameters of the manifest file comprise, for at least one of the virtual cameras and/or the reference viewpoint, a plurality of uniform resource identifiers, each one of said uniform resource identifiers being associated to a bit-rate level.

During the rendering of the volumetric video, the terminal constantly tracks user information (user position in the scene, user acceleration) from which it can predict a new viewpoint for the next temporal segment.

In a step E112, the terminal selects at least one atlas for rendering the new viewpoint for the next temporal segment using the information of the manifest. It is to be noted that the terminal here selects only the atlases associated to peripheral virtual cameras, as the reference data is always needed for rendering a viewpoint of the volumetric video.

According to an embodiment of the present disclosure, such a selecting step comprises determining a network bandwidth available for requesting a next temporal segment of the volumetric video. Then, the terminal determines, according to the information comprised in the file and according to the network bandwidth, a reference view and at least one atlas associated with a viewpoint corresponding to a virtual camera for rendering the next temporal segment of the volumetric video. The terminal takes into account the available network bandwidth to select a maximum number of available peripheral atlases.

When running its algorithm to select the next video representation that it will request from the server for the predicted viewpoint, the terminal is able to compute an estimate of the network bandwidth that is currently available for that purpose. It knows from the signaling received from the server the bandwidth necessary for the delivery of the reference atlas and of each additional color+depth atlas $A_{i,j}$. From that, it can estimate which possible combinations of central reference atlas $A_{i,0}$ and additional atlases $A_{i,j}$ it can afford with the available bandwidth, and it will select among them the combination it will request the server to deliver, based on various strategies it may implement.

According to an embodiment of the present disclosure, for determining a reference view and at least one atlas associated with a viewpoint, the terminal can predict one or more future possible rendering viewpoint(s), for instance according to the user's behavior in the volumetric video.

Such an embodiment takes into account the anticipated position of the viewpoint versus the reference viewpoint $V_{i,0}$, to prioritize atlases corresponding to the virtual cameras best located to provide parallax for the center of the viewpoint. In this case, the terminal selects the main central reference camera for $V_{i,0}$, plus all virtual cameras at viewpoints $V_{i,j}$ that include parallax information for the anticipated viewpoint, and unselects cameras of the previous viewpoint irrelevant for this new viewpoint. This process of unselecting and selecting new cameras is illustrated in FIG. 13. FIG. 13 illustrates the adaptive selection of virtual cameras with a 3DoF+ cell $C_i$ by the terminal at time t and t+1 of the video content. FIG. 13(a) illustrates the selection of virtual cameras at viewpoints $V_{i,0}$, $V_{i,1}$, $V_{i,2}$ for a temporal segment at t=1. FIG. 13(b) illustrates the un-selection of virtual camera $V_{i,1}$ and the selection of virtual cameras at viewpoints $V_{i,0}$, $V_{i,2}$, $V_{i,3}$ for the next temporal segment at t=1+1.

Circled grey crosses represent the central camera ($V_{i,0}$). Grey crosses represent viewpoints corresponding to selected virtual cameras and dashed crosses represent viewpoints corresponding to unselected virtual cameras. It can be seen that from t to t+1, taking into account the user's navigation behavior (user's position is illustrated by the grey point) on the volumetric video allows for the next temporal segment t+1 to select the virtual camera $V_{i,3}$ and unselect the virtual camera $V_{i,1}$.

According to a variant, for determining a reference view and at least one atlas associated with a viewpoint, the terminal can determine regions of interest for which parallax is improved with a transmission of a corresponding atlas. In this variant, the terminal privileges the quality of the rendering of a viewpoint. This embodiment takes into account the regions of interests best processed, in terms of parallax, by the additional atlases $A_{i,j}$ (for instance by prioritizing the regions of interest from the closest, in terms of depth, to the most remote).

When the terminal has selected the atlases, in a step E113, the terminal requests to a content server, the corresponding data streams, using information comprised in the manifest file. More particularly, the terminal requests the data stream representative of the reference view, and the one or more data streams of the selected atlases.

In a step E114, the terminal decodes the received data streams for rendering the viewpoint to a user.

According to an embodiment of the present disclosure, some of the "adaptive parallax parameters" can change in the course of the video content. For instance, the number of side virtual cameras in a 3DOF+ cell $C_i$ can change.

According to an embodiment of the present disclosure, in a step E115, the terminal receives a data stream representative of updating data of the manifest file, which comprises at least one value for updating at least one of the adaptive parallax parameters that may change. This updating data comprises the list and values of the parameters that change. The terminal then updates accordingly its internal records, in order to take these changes into account when running its algorithms to select the color+depth atlas $A_{i,j}$ associated to side virtual cameras that it will request from the server.

This updated data can be transmitted according to various schemes:

It can be embedded as meta-data transported with the content itself. This in turn may be realized in different ways, such as embedding within a video stream itself, or using a dedicated track component.

It can be pushed by the server to all terminals. This requires that some dedicated transmission channel be opened by each terminal playing the content to receive pushed updates of "adaptive parallax parameters".

Some event system can be implemented so that the server just sends a "heads up" indication to all terminals when an update is available. It is then the responsibility of each terminal to react to this indication and request the current "adaptive parallax parameters" from the server, for example through a simple HTTP GET on an XML, or JSON document.

These options are not mutually exclusive, and a deployed system may support one or several of them, as the use of any allows to signal the same information.

The choice among these options (or other non-described options) may be guided by performance considerations, limitations of the streaming system used or the need that all clients take the changes into account or not.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Processors also include communication devices, such as, for example, Smartphones, tablets, computers, mobile phones, portable/personal digital assistants ("PDAs"), Television, HMD, and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a Television, an HMD and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for decoding a volumetric video, the method comprising:
receiving a data stream representative of information for selecting, according to a rendering viewpoint, at least one atlas comprising color and depth data patches associated with a viewpoint in said volumetric video, said color and depth data patches being generated with respect to depth and color reference data acquired from a reference viewpoint in said volumetric video, wherein said information comprises a list of adaptive parallax parameters comprising:
a list of reference viewpoints comprising at least one reference viewpoint, and for each of said reference viewpoints:
associated coordinates of said at least one reference viewpoint in a volumetric cartesian coordinates system, and
at least one uniform resource identifier allowing to download an encoded data stream representative of an atlas associated with said reference viewpoint;
for each of said reference viewpoints in the list, a number of virtual cameras, each of said virtual cameras corresponding to a viewpoint in said volumetric video; and
for each of said virtual cameras:
associated coordinates of said viewpoint corresponding to said virtual camera in said 3D cartesian coordinates system, and
at least one uniform resource identifier allowing to download an encoded data stream representative of an atlas associated with said virtual camera.

2. The method of claim 1, further comprising:
requesting from a server, using said information:
at least one data stream representative of a reference view comprising said color and depth reference data, and
at least one data stream representative of at least one selected atlas; and
decoding said at least one data stream representative of said reference view and said at least one data stream representative of said at least one selected atlas.

3. The method of claim 1, wherein selecting the at least one atlas according to a rendering viewpoint of said volumetric video, comprises:
determining a network bandwidth available for requesting a next temporal segment of said volumetric video; and
determining, according to said information and according to said network bandwidth, a reference view and the at least one atlas associated with a viewpoint corresponding to a virtual camera for rendering said next temporal segment of said volumetric video.

4. The method of claim 1, wherein selecting the at least one atlas according to a rendering viewpoint of said volumetric video uses at least one of:
predicting at least one future rendering viewpoint; and
determining regions of interest for which parallax is improved with a transmission of a corresponding atlas.

5. The method of claim 1, wherein said adaptive parallax parameters further comprise at least one parameter belonging to the group:

a parameter quantifying a size of said encoded data stream representative of an atlas associated with a virtual camera or a reference viewpoint;
a group of parameters defining a projection associated with a virtual camera to be used for 2D to 3D conversion; and
a list of at least one zone of interest for which parallax is improved with a transmission of a corresponding atlas.

6. The method of claim 1, wherein said information further comprises for at least one of said adaptive parallax parameters, an indication of a time when said at least one adaptive parallax parameter may change during rendering of said volumetric video.

7. The method of claim 6, wherein said at least one adaptative parallax parameter which may change corresponds to the number of virtual cameras associated to a reference viewpoint.

8. The method of claim 1, wherein said adaptative parallax parameters comprises, for at least one of said virtual cameras and/or one of said at least reference viewpoint, a plurality of uniform resource identifiers, each of said uniform resource identifiers being associated to a bit-rate level.

9. The method of claim 1, further comprising:
receiving a data stream representative of updating the information, wherein said updating the information comprises at least one value for updating at least one of said adaptative parallax parameters.

10. A method for encoding a volumetric video, comprising:
encoding at least one data stream representative of at least one reference view comprising color and depth reference data acquired from a reference viewpoint in the volumetric video;
encoding at least one data stream representative of at least one atlas comprising color and depth data patches acquired from a viewpoint in said volumetric video, said color and depth data patches being generated with respect to depth and color reference data; and
encoding a data stream comprising information for selecting the at least one atlas, according to a rendering viewpoint in said volumetric video, wherein said information comprises a list of adaptive parallax parameters comprising:
a list of reference viewpoints comprising at least one reference viewpoint, and for each of said reference viewpoints:
associated coordinates of said at least one reference viewpoint in a volumetric cartesian coordinates system, and
at least one uniform resource identifier allowing to download an encoded data stream representative of an atlas associated with said reference viewpoint;
for each of said reference viewpoints in the list, a number of virtual cameras, each of said virtual cameras corresponding to a viewpoint in said volumetric video; and
for each of said virtual cameras:
associated coordinates of said viewpoint corresponding to said virtual camera in said 3D cartesian coordinates system, and
at least one uniform resource identifier allowing to download an encoded data stream representative of an atlas associated with said virtual camera.

11. The method of claim 10, wherein said adaptive parallax parameters further comprise at least one parameter belonging to the group:
a parameter quantifying a size of said encoded data stream representative of an atlas associated with a virtual camera or a reference viewpoint;
a group of parameters defining a projection associated with a virtual camera to be used for 2D to 3D conversion; and
a list of at least one zone of interest for which parallax is improved with a transmission of a corresponding atlas.

12. The method of claim 10, wherein said information further comprises for at least one of said adaptive parallax parameters, an indication of a time when said at least one adaptive parallax parameter may change during rendering of said volumetric video.

13. The method of claim 12, wherein said at least one adaptative parallax parameter which may change corresponds to the number of virtual cameras associated to a reference viewpoint.

14. The method of claim 10, wherein said adaptative parallax parameters comprises, for at least one of said virtual cameras and/or one of said at least reference viewpoint, a plurality of uniform resource identifiers, each of said uniform resource identifiers being associated to a bit-rate level.

15. The method of claim 10, further comprising receiving a data stream representative of updating information, wherein said updating information comprises at least one value for updating at least one of said adaptative parallax parameters.

16. A non-transitory storage medium storing information for selecting, according to rendering viewpoint of a volumetric video, at least one atlas comprising color and depth data patches acquired from a viewpoint in said volumetric video, said color and depth data patches being generated with respect to depth and color reference data acquired from a reference viewpoint in said volumetric video, wherein said information comprises a list of adaptive parallax parameters comprising:
a list of reference viewpoints comprising at least one reference viewpoint, and for each of said reference viewpoints:
associated coordinates of said at least one reference viewpoint in a volumetric cartesian coordinates system, and
at least one uniform resource identifier allowing to download an encoded data stream representative of an atlas associated with said reference viewpoint;
for each of said reference viewpoints in the list, a number of virtual cameras, each of said virtual cameras corresponding to a viewpoint in said volumetric video; and
for each of said virtual cameras:
associated coordinates of said viewpoint corresponding to said virtual camera in said 3D cartesian coordinates system, and
at least one uniform resource identifier allowing to download an encoded data stream representative of an atlas associated with said virtual camera.

17. The non-transitory storage medium of claim 16, wherein said adaptive parallax parameters further comprise at least one parameter belonging to the group:
a parameter quantifying a size of said encoded data stream representative of an atlas associated with a virtual camera or a reference viewpoint;
a group of parameters defining a projection associated with a virtual camera to be used for 2D to 3D conversion; and
a list of at least one zone of interest for which parallax is improved with a transmission of a corresponding atlas.

18. The non-transitory storage medium of claim 16, wherein said information further comprises for at least one of said adaptive parallax parameters, an indication of a time when said at least one adaptive parallax parameter may change during rendering of said volumetric video.

19. The non-transitory storage medium of claim 18, wherein said at least one adaptative parallax parameter which may change corresponds to the number of virtual cameras associated to a reference viewpoint.

20. The non-transitory storage medium of claim 16, wherein said adaptative parallax parameters comprises, for at least one of said virtual cameras and/or one of said at least reference viewpoint, a plurality of uniform resource identifiers, each of said uniform resource identifiers being associated to a bit-rate level.

21. An apparatus for decoding a volumetric video, the apparatus comprising a processor configured for:
   receiving a data stream comprising information for selecting, according to a rendering viewpoint, at least one atlas comprising color and depth data patches acquired from a viewpoint in said volumetric video, said color and depth data patches being generated with respect to depth and color reference data acquired from a reference viewpoint in said volumetric video, wherein said information comprises a list of adaptive parallax parameters comprising:
      a list of reference viewpoints comprising at least one reference viewpoint, and for each of said reference viewpoints:
         associated coordinates of said at least one reference viewpoint in a volumetric cartesian coordinates system, and
         at least one uniform resource identifier allowing to download an encoded data stream representative of an atlas associated with said reference viewpoint;
      for each of said reference viewpoints in the list, a number of virtual cameras, each of said virtual cameras corresponding to a viewpoint in said volumetric video; and
      for each of said virtual cameras:
         associated coordinates of said viewpoint corresponding to said virtual camera in said 3D cartesian coordinates system, and
   at least one uniform resource identifier allowing to download an encoded data stream representative of an atlas associated with said virtual camera.

22. The apparatus of claim 21, further comprising:
   means for requesting from a server, using said information:
   at least one data stream representative of a reference view comprising said color and depth reference data, and
   at least one data stream representative of the at least one selected atlas; and
      means for decoding said at least one data stream representative of said reference view and said at least one data stream representative of said at least one selected atlas.

23. An apparatus for encoding a volumetric video, the apparatus comprising a processor configured for:
   encoding at least one data stream representative of at least one reference view comprising color and depth reference data acquired from a reference viewpoint in said volumetric video;
   encoding at least one data stream representative of at least one atlas comprising color and depth data patches acquired from a viewpoint in said volumetric video, said color and depth data patches being generated with respect to depth and color reference data acquired from said reference viewpoint in said volumetric video; and
   encoding a data stream comprising information for selecting at least one atlas, according to a rendering viewpoint of said volumetric video, wherein said information comprises a list of adaptive parallax parameters comprising:
      a list of reference viewpoints comprising at least one reference viewpoint, and for each of said reference viewpoints:
         associated coordinates of said at least one reference viewpoint in a volumetric cartesian coordinates system, and
         at least one uniform resource identifier allowing to download an encoded data stream representative of an atlas associated with said reference viewpoint;
      for each of said reference viewpoints in the list, a number of virtual cameras, each of said virtual cameras corresponding to a viewpoint in said volumetric video; and
      for each of said virtual cameras:
         associated coordinates of said viewpoint corresponding to said virtual camera in said 3D cartesian coordinates system, and
   at least one uniform resource identifier allowing to download an encoded data stream representative of an atlas associated with said virtual camera.

* * * * *